(12) United States Patent
Karr et al.

(10) Patent No.: US 7,689,803 B2
(45) Date of Patent: Mar. 30, 2010

(54) SYSTEM AND METHOD FOR COMMUNICATION USING EMULATED LUN BLOCKS IN STORAGE VIRTUALIZATION ENVIRONMENTS

(75) Inventors: Ronald S. Karr, Palo Alto, CA (US); Mukul Kumar, Pune (IN); Subhojit Roy, Pune (IN)

(73) Assignee: Symantec Operating Corporation, Mountain View, CA (US)

( * ) Notice: Subject to any disclaimer, the term of this patent is extended or adjusted under 35 U.S.C. 154(b) by 226 days.

(21) Appl. No.: 11/156,635

(22) Filed: Jun. 20, 2005

(65) Prior Publication Data
US 2005/0228937 A1 Oct. 13, 2005

Related U.S. Application Data

(63) Continuation-in-part of application No. 10/722,614, filed on Nov. 26, 2003.

(30) Foreign Application Priority Data

Nov. 22, 2004 (WO) ............... PCT/US2004/039306

(51) Int. Cl.
*G06F 12/00* (2006.01)
*G06F 13/00* (2006.01)
*G06F 13/28* (2006.01)

(52) U.S. Cl. ..................................... 711/203
(58) Field of Classification Search ............... 711/6, 711/203
See application file for complete search history.

(56) References Cited

U.S. PATENT DOCUMENTS

| | | | |
|---|---|---|---|
| 5,193,184 A * | 3/1993 | Belsan et al. ............ | 711/4 |
| 6,044,367 A | 3/2000 | Wolff | |
| 6,240,416 B1 | 5/2001 | Immon et al. | |
| 6,311,213 B2 | 10/2001 | Dawson et al. | |
| 6,467,023 B1 | 10/2002 | DeKoning | |
| 6,792,557 B1 | 9/2004 | Takamoto et al. | |
| 6,816,917 B2 | 11/2004 | Dicorpo et al. | |
| 6,889,309 B1 | 5/2005 | Oliveira et al. | |
| 7,020,760 B2 | 3/2006 | Glider | |
| 7,039,827 B2 * | 5/2006 | Meyer et al. ............ | 714/4 |

(Continued)

OTHER PUBLICATIONS

"IBM Storage Tank A distributed Storage System," IBM Corporation, pp. 1-16, Jan. 24, 2002.

(Continued)

*Primary Examiner*—Sheng-Jen Tsai
(74) *Attorney, Agent, or Firm*—Meyertons, Hood, Kivlin, Kowert & Goetzel, P.C.; B. Noel Kivlin

(57) ABSTRACT

A system for communication using emulated LUN blocks in storage virtualization environments includes a first host and an off-host virtualizer. The off-host virtualizer may be configured to generate operating system metadata for a virtual storage device, and to make the operating system metadata accessible to the first host. A first layer of a storage software stack at the host may use the operating system metadata to detect the existence of the virtual storage device as an addressable storage device. The off-host virtualizer may also be configured to provide configuration information at a designated set of block addresses within the virtual storage device. A second layer of the storage software stack may be configured to read the configuration information from the designated set of blocks.

23 Claims, 10 Drawing Sheets

U.S. PATENT DOCUMENTS

| | | | |
|---|---|---|---|
| 7,082,503 | B2 | 7/2006 | Ito |
| 7,100,089 | B1 | 8/2006 | Phelps |
| 7,188,194 | B1 | 3/2007 | Kuik |
| 2002/0065810 | A1* | 5/2002 | Bradley .................. 707/2 |
| 2002/0087751 | A1 | 7/2002 | Chong, Jr. |
| 2002/0103889 | A1 | 8/2002 | Markson et al. |
| 2002/0156984 | A1* | 10/2002 | Padovano ................ 711/148 |
| 2002/0166005 | A1* | 11/2002 | Errico ..................... 710/38 |
| 2003/0131182 | A1* | 7/2003 | Kumar et al. ............. 711/5 |
| 2003/0140193 | A1* | 7/2003 | Acharya et al. .......... 711/112 |
| 2003/0172149 | A1* | 9/2003 | Edsall et al. ............. 709/224 |
| 2003/0177330 | A1* | 9/2003 | Idei et al. ................. 711/202 |
| 2004/0030822 | A1* | 2/2004 | Rajan et al. .............. 711/4 |
| 2004/0103261 | A1* | 5/2004 | Honda et al. ............. 711/202 |
| 2004/0151188 | A1* | 8/2004 | Maveli et al. ............ 370/398 |
| 2005/0125538 | A1* | 6/2005 | Tawil ....................... 709/226 |
| 2005/0228937 | A1 | 10/2005 | Karr |
| 2005/0228950 | A1 | 10/2005 | Karr |
| 2005/0235132 | A1 | 10/2005 | Karr et al. |
| 2006/0112251 | A1 | 5/2006 | Karr |

OTHER PUBLICATIONS

"Eternus6000 Storage Systems", Fujitsu Limited, Technical White Paper, May 2005.

* cited by examiner

SYSTEM AND METHOD FOR COMMUNICATION USING EMULATED LUN BLOCKS IN STORAGE VIRTUALIZATION ENVIRONMENTS

This application is a continuation-in-part of U.S. patent application Ser. No. 10/722,614, entitled "SYSTEM AND METHOD FOR EMULATING OPERATING SYSTEM METADATA TO PROVIDE CROSS-PLATFORM ACCESS TO STORAGE VOLUMES", filed Nov. 26, 2003.

BACKGROUND OF THE INVENTION

1. Field of the Invention

This invention relates to computer systems and, more particularly, to off-host virtualization within storage environments.

2. Description of the Related Art

Many business organizations and governmental entities rely upon applications that access large amounts of data, often exceeding a terabyte of data, for mission-critical applications. Often such data is stored on many different storage devices, which may be heterogeneous in nature, including many different types of devices from many different manufacturers.

Configuring individual applications that consume data, or application server systems that host such applications, to recognize and directly interact with each different storage device that may possibly be encountered in a heterogeneous storage environment would be increasingly difficult as the environment scaled in size and complexity. Therefore, in some storage environments, specialized storage management software and hardware may be used to provide a more uniform storage model to storage consumers. Such software and hardware may also be configured to present physical storage devices as virtual storage devices (e.g., virtual SCSI disks) to computer hosts, and to add storage features not present in individual storage devices to the storage model. For example, features to increase fault tolerance, such as data mirroring, snapshot/fixed image creation, or data parity, as well as features to increase data access performance, such as disk striping, may be implemented in the storage model via hardware or software. The added storage features may be referred to as storage virtualization features, and the software and/or hardware providing the virtual storage devices and the added storage features may be termed "virtualizers" or "virtualization controllers". Virtualization may be performed within computer hosts, such as within a volume manager layer of a storage software stack at the host, and/or in devices external to the host, such as virtualizing switches or virtualization appliances. Such external devices providing virtualization may be termed "off-host" virtualizers, and may be utilized in order to offload processing required for virtualization from the host. Off-host virtualizers may be connected to the external physical storage devices for which they provide virtualization functions via a variety of interconnects, such as Fiber Channel links, Internet Protocol (IP) networks, and the like.

Traditionally, storage software within a computer host consists of a number of layers, such as a file system layer, a disk driver layer, etc. Some of the storage software layers may form part of the operating system in use at the host, and may differ from one operating system to another. When accessing a physical disk, a layer such as the disk driver layer for a given operating system may be configured to expect certain types of configuration information for the disk to be laid out in a specific format, for example in a header (located at the first few blocks of the disk) containing disk partition layout information. The disk driver layer used to access local physical disks may also be utilized to access external storage devices presented as virtual storage devices by off-host virtualizers. Therefore it may be desirable for an off-host virtualizer to provide configuration information for the virtual storage devices in a format expected by the disk driver layer, for example so that a SCSI target (e.g., a logical unit or LUN) may be emulated by the virtual storage device. In some storage environments it may also be desirable for the off-host virtualizer to provide additional virtualization-related configuration information to one or more higher-level layers of the storage software stack, and to receive host-generated configuration information from the higher-level layers.

SUMMARY

Various embodiments of a system and method for communication using emulated LUN blocks in storage virtualization environments are disclosed. According to a first embodiment, a system may include a first host and an off-host virtualizer, such as a virtualizing switch or a virtualization appliance. The off-host virtualizer may be configured to generate operating system metadata for a virtual storage device such as a virtual LUN, and to make the operating system metadata accessible to a first layer of a storage software stack (such as a disk driver layer) at the first host. The first layer of the storage software stack may use the operating system metadata to detect the existence of the virtual storage device as an addressable storage device. The off-host virtualizer may also be configured to provide configuration information at a designated set of block addresses within the virtual storage device. A second layer of the storage software stack, such as an intermediate driver layer between the disk driver layer and a file system layer, may be configured to read the configuration information from the designated set of blocks. That is, once the virtual storage device is recognized as an addressable device with the help of the first layer, the off-host virtualizer may communicate with a second layer of the software storage stack using designated blocks within the virtual storage device.

In some embodiments, the communication between the off-host virtualizer and the second layer of the software storage stack may be bi-directional. That is, the second layer of the storage software stack may also be configured to write host-generated configuration information to a second set of designated blocks within the virtual storage device, which may then be read by the off-host virtualizer. A number of different types of information may be exchanged between the off-host virtualizer and the second layer of the storage software stack using the designated blocks. Information provided by the off-host virtualizer to the host may include logical volume identification, security codes, multi-pathing state information, and statistics on the I/Os performed on the virtual storage device, for example. Information provided by the host to the off-host virtualizer may include cluster state information, I/O fencing requests, device numbers useful in maintaining consistent NFS file handles across NFS failovers, etc.

Figure 1A:
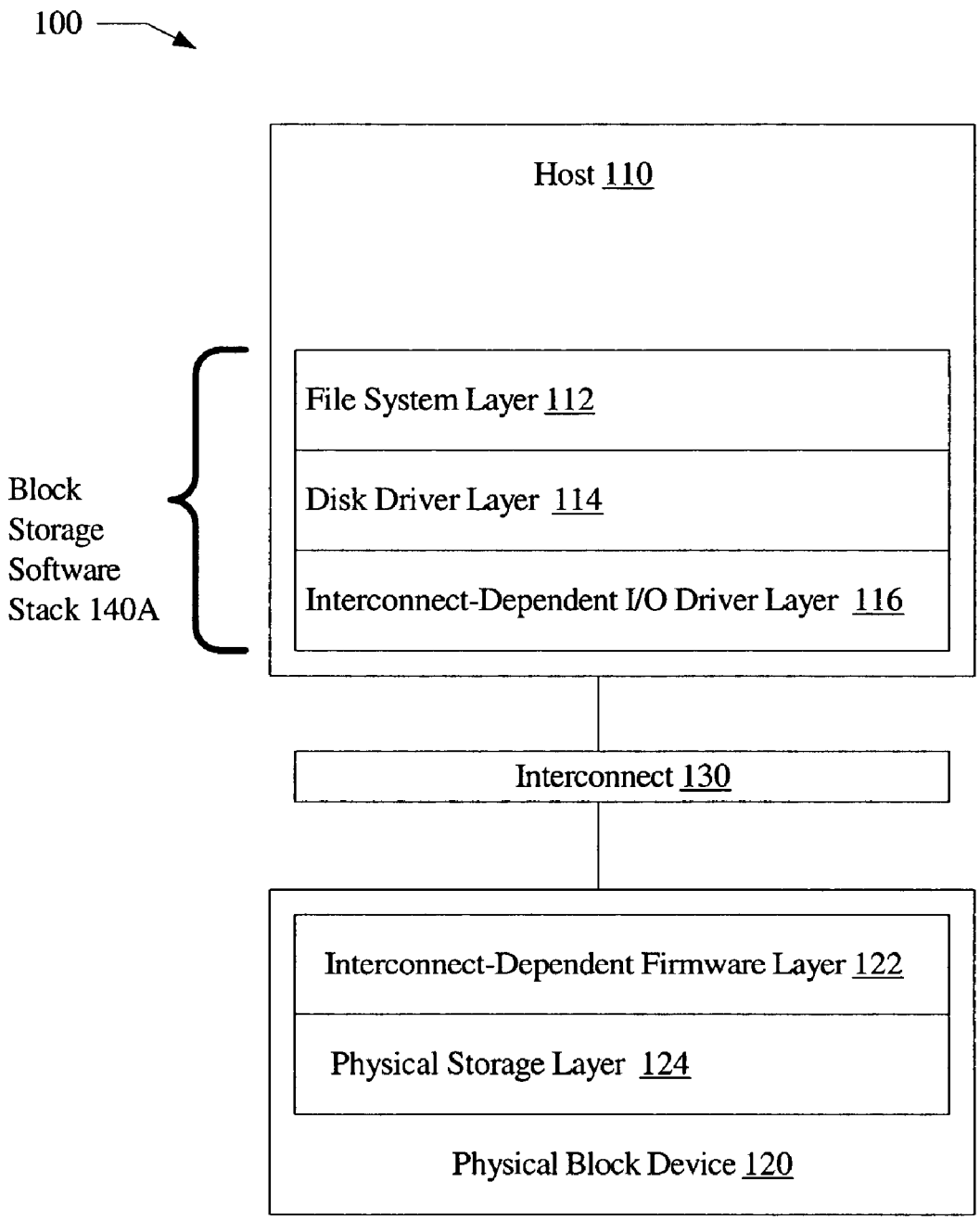
FIG. 1a is a block diagram illustrating a computer system according to one embodiment.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

FIG. 1a is a block diagram illustrating a computer system 100 according to one embodiment. System 100 includes a host 110 coupled to a physical block device 120 via an interconnect 130. Host 110 includes a traditional block storage software stack 140A that may be used to perform I/O operations on a physical block device 120 via interconnect 130.

Generally speaking, a physical block device 120 may comprise any hardware entity that provides a collection of linearly addressed data blocks that can be read or written. For example, in one embodiment a physical block device may be a single disk drive configured to present all of its sectors as an indexed array of blocks. In another embodiment the physical block device may be a disk array device, or a disk configured as part of a disk array device. It is contemplated that any suitable type of storage device may be configured as a block device, such as fixed or removable magnetic media drives (e.g., hard drives, floppy or Zip-based drives), writable or read-only optical media drives (e.g., CD or DVD), tape drives, solid-state mass storage devices, or any other type of storage device. The interconnect 130 may utilize any desired storage connection technology, such as various variants of the Small Computer System Interface (SCSI) protocol, Fiber Channel, Internet Protocol (IP), Internet SCSI (iSCSI), or a combination of such storage networking technologies. The block storage software stack 140A may comprise layers of software within an operating system at host 110, and may be accessed by a client application to perform I/O (input/output) on a desired physical block device 120.

In the traditional block storage stack, a client application may initiate an I/O request, for example as a request to read a block of data at a specified offset within a file. The request may be received (e.g., in the form of a read( ) system call) at the file system layer 112, translated into a request to read a block within a particular device object (i.e., a software entity representing a storage device), and passed to the disk driver layer 114. The disk driver layer 114 may then select the targeted physical block device 120 corresponding to the disk device object, and send a request to an address at the targeted physical block device over the interconnect 130 using the interconnect-dependent I/o driver layer 116. For example, a host bus adapter (such as a SCSI HBA) may be used to transfer the I/O request, formatted according to the appropriate storage protocol (e.g., SCSI), to a physical link of the interconnect (e.g., a SCSI bus). At the physical block device 120, an interconnect-dependent firmware layer 122 may receive the request, perform the desired physical I/O operation at the physical storage layer 124, and send the results back to the host over the interconnect. The results (e.g., the desired blocks of the file) may then be transferred through the various layers of storage stack 140A in reverse order (i.e., from the interconnect-dependent I/O driver to the file system) before being passed to the requesting client application.

In some operating systems, the storage devices addressable from a host 110 may be detected only during system initialization, e.g., during boot. For example, an operating system may employ a four-level hierarchical addressing scheme of the form <"hba", "bus", "target", "lun"> for SCSI devices, including a SCSI HBA identifier ("hba"), a SCSI bus identifier ("bus"), a SCSI target identifier ("target"), and a logical unit identifier ("lun"), and may be configured to populate a device database with addresses for available SCSI devices during boot. Host 110 may include multiple SCSI HBAs, and a different SCSI adapter identifier may be used for each HBA. The SCSI adapter identifiers may be numbers issued by the operating system kernel, for example based on the physical placement of the HBA cards relative to each other (i.e., based on slot numbers used for the adapter cards). Each HBA may control one or more SCSI buses, and a unique SCSI bus number may be used to identify each SCSI bus within an HBA. During system initialization, or in response to special configuration commands, the HBA may be configured to probe each bus to identify the SCSI devices currently attached to the bus. Depending on the version of the SCSI protocol in use, the number of devices (such as disks or disk arrays) that may be attached on a SCSI bus may be limited, e.g., to 15 devices excluding the HBA itself. SCSI devices that may initiate I/O operations, such as the HBA, are termed SCSI initiators, while devices where the physical I/O may be performed are called SCSI targets. Each target on the SCSI bus may identify itself to the HBA in response to the probe. In addition, each target device may also accommodate up to a protocol-specific maximum number of "logical units" (LUNs) representing independently addressable units of physical storage within the target device, and may inform the HBA of the logical unit identifiers. A target device may contain a single LUN (e.g., a LUN may represent an entire disk or even a disk array) in some embodiments. The SCSI device configuration information, such as the target device identifiers and LUN identifiers may be passed to the disk driver layer 114 by the HBAs. When issuing an I/O request, disk driver layer 114 may utilize the hierarchical SCSI address described above.

When accessing a LUN, disk driver layer 114 may expect to see OS-specific metadata at certain specific locations within the LUN. For example, in many operating systems, the disk driver layer 114 may be responsible for implementing logical partitioning (i.e., subdividing the space within a physical disk into partitions, where each partition may be used for a smaller file system). Metadata describing the layout of a partition (e.g., a starting block offset for the partition within the LUN, and the length of a partition) may be stored in an operating-system dependent format, and in an operating system-dependent location, such as in a header or a trailer, within a LUN. In the Solaris™ operating system from Sun Microsystems, for example, a virtual table of contents (VTOC) structure may be located in the first partition of a disk volume, and a copy of the VTOC may also be located in the last two cylinders of the volume. In addition, the operating system metadata may include cylinder alignment and/or cylinder size information, as well as boot code if the volume is bootable. Operating system metadata for various versions of Microsoft Windows™ may include a "magic number" (a special number or numbers that the operating system expects to find, usually at or near the start of a disk), subdisk layout information, etc. If the disk driver layer 114 does not find the metadata in the expected location and in the expected format, the disk driver layer may not be able to perform I/O operations at the LUN; in such cases, the disk driver may, for example, prompt the user to initialize a device and/or report errors.

The relatively simple traditional storage software stack 140A has been enhanced over time to help provide advanced storage features, most significantly by introducing block virtualization layers. In general, block virtualization refers to a process of creating or aggregating logical or virtual block devices out of one or more underlying physical or logical block devices, and making the virtual block devices accessible to block device consumers for storage operations. For example, in one embodiment of block virtualization, storage within multiple physical block devices, e.g. in a fiber channel storage area network (SAN), may be aggregated and presented to a host as a single virtual storage device such as a virtual LUN (VLUN), as described below in further detail. In another embodiment, one or more layers of software may rearrange blocks from one or more block devices, such as disks, and add various kinds of functions. The resulting rearranged collection of blocks may then be presented to a storage consumer, such as an application or a file system, as one or more aggregated devices with the appearance of one or more basic disk drives. That is, the more complex structure resulting from rearranging blocks and adding functionality may be presented as if it were one or more simple arrays of blocks, or logical block devices. In some embodiments, multiple layers of virtualization may be implemented. That is, one or more block devices may be mapped into a particular virtualized block device, which may be in turn mapped into still another virtualized block device, allowing complex storage functions to be implemented with simple block devices. Further details on block virtualization, and advanced storage features supported by block virtualization, are provided below.

Block virtualization may be implemented at various places within a storage stack and the associated storage environment, in both hardware and software. For example, a block virtualization layer in the form of a volume manager, such as the VERITAS Volume Manager™ from VERITAS Software Corporation, may be added between the disk driver layer 114 and the file system layer 112. In some storage environments, virtualization functionality may be added to host bus adapters, i.e., in a layer between the interconnect-dependent I/O driver layer 116 and interconnect 130. Block virtualization may also be performed outside the host 110, e.g., in a virtualization appliance or a virtualizing switch, which may form part of the interconnect 130. Such external devices providing block virtualization (i.e., devices that are not incorporated within host 110) may be termed off-host virtualizers or off-host virtualization controllers. In some storage environments, block virtualization functionality may be implemented by an off-host virtualizer in cooperation with a host-based virtualizer. That is, some block virtualization functionality may be performed off-host, and other block virtualization features may be implemented at the host.

While additional layers may be added to the storage software stack 140A, it is generally difficult to remove or completely bypass existing storage software layers of operating systems. Therefore, off-host virtualizers may typically be implemented in a manner that allows the existing storage software layers to continue to operate, even when the storage devices being presented to the operating system are virtual rather than physical, and remote rather than local. For example, because disk driver layer 114 expects to deal with SCSI LUNs when performing I/O operations, an off-host virtualizer may present a virtualized storage device to the disk driver layer as a virtual LUN. That is, as described below in further detail, on off-host virtualizer may encapsulate, or emulate the metadata for, a LUN when providing a host 110 access to a virtualized storage device. In addition, as also described below, one or more software modules or layers may be added to storage stack 140A to support additional forms of virtualization using virtual LUNs.

Figure 1B:
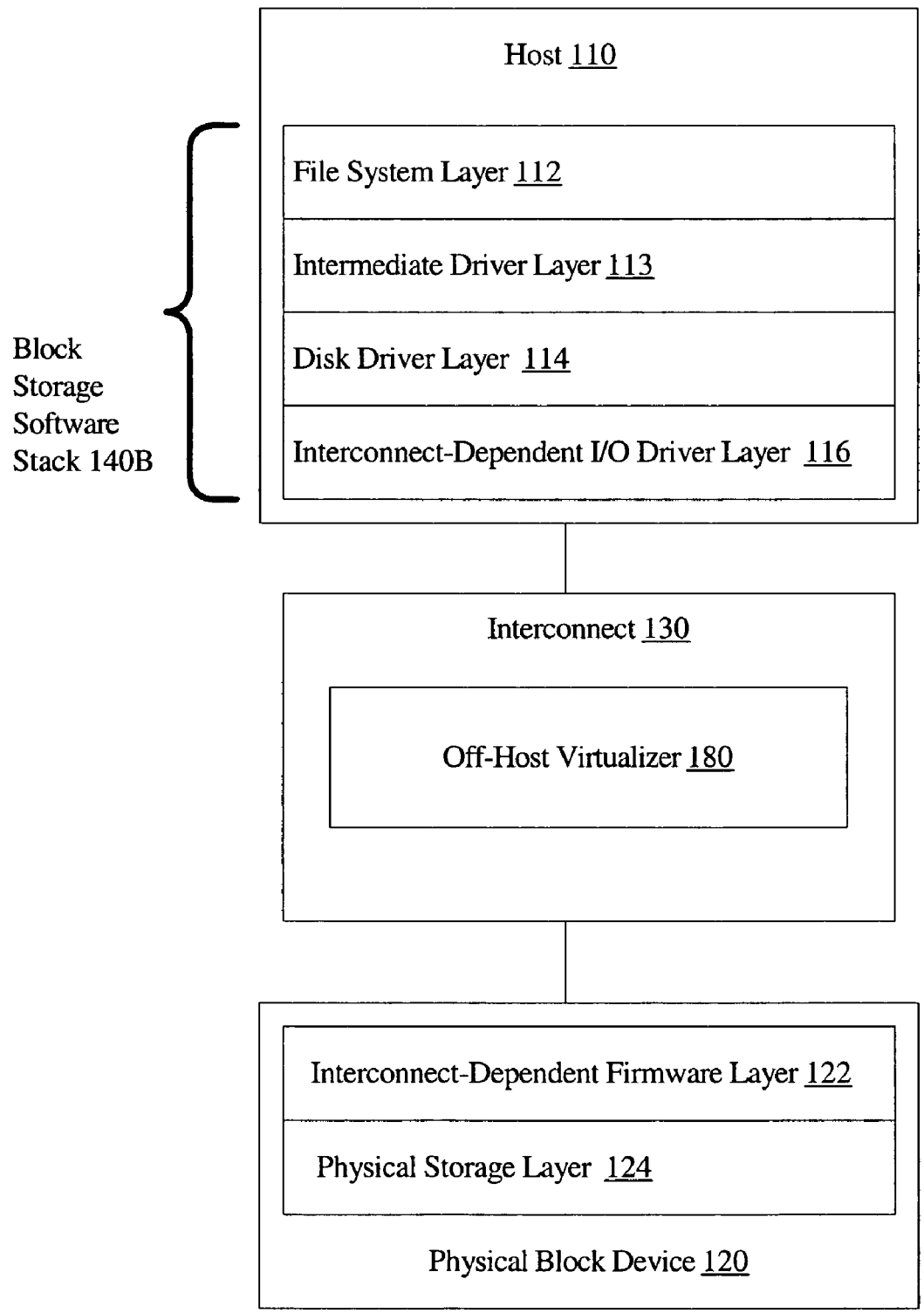
FIG. 1b is a block diagram illustrating an embodiment of a system configured to utilize off-host block virtualization.

FIG. 1b is a block diagram illustrating an embodiment of system 100 configured to utilize off-host block virtualization. As shown, the system may include an off-host virtualizer 180, such as a virtualizing switch or a virtualization appliance, which may be included within interconnect 130 linking host 110 to physical block device 120. Host 110 may comprise an enhanced storage software stack 140B, which may include an intermediate driver layer 113 between the disk driver layer 114 and file system layer 112. In one embodiment, off-host virtualizer 180 may be configured to map storage within physical block device 120, or multiple physical block devices 120, into a virtual storage device (e.g., a virtual LUN or VLUN), and present the virtual storage device to host 110. The back-end storage within a physical block device 120 that is mapped to a virtual LUN may be termed a "physical LUN (PLUN)". In another embodiment, off-host virtualizer 180 may be configured to aggregate storage within one or more physical block devices 120 as one or more logical volumes, and map the logical volumes within the address space of a virtual LUN presented to host 110.

Off-host virtualizer 180 may further be configured to provide intermediate driver layer 113 with metadata or configuration information on the logical volumes, for example by writing the configuration information to designated blocks within the VLUN, as described below in further detail. The configuration information may allow intermediate driver layer 113 to locate and perform I/O operations on the logical volumes located within the virtual LUN on behalf of clients such as file system layer 112 or other applications, and may also support other features such as security and error recovery. File system layer 112 and applications (such as database management systems) configured to utilize intermediate driver layer 113 and lower layers of storage stack 140B may be termed "virtual storage clients" or "virtual storage consumers" herein. While off-host virtualizer 180 is shown within interconnect 130 in the embodiment depicted in FIG. 1b, it is noted that in other embodiments, off-host virtualization may also be provided within physical block device 120 (e.g., by a virtualization layer between physical storage layer 124 and firmware layer 122), or at another device outside interconnect 130.

Figure 2:
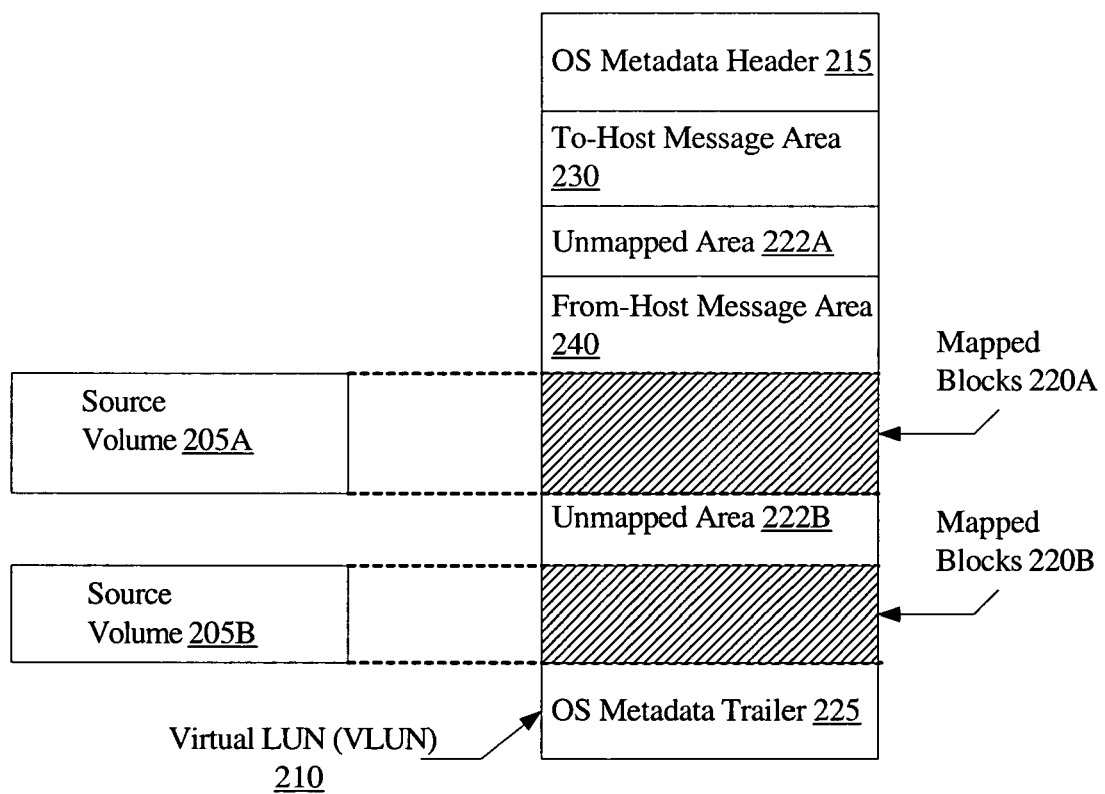
FIG. 2 is a block diagram illustrating the addition of operating-system specific metadata to a virtual LUN encapsulating two source volumes, according to one embodiment.

As described above, in some embodiments, disk driver layer 114 may expect certain operating system-specific metadata to be present at operating-system specific locations or offsets within a LUN. When presenting a virtual LUN to a host 110, therefore, in such embodiments off-host virtualizer 180 may be configured to logically insert the expected metadata at the expected locations. FIG. 2 is a block diagram illustrating the addition of operating-system specific metadata to a virtual LUN 210 encapsulating two source volumes 205A and 205B, according to one embodiment.

As shown, the virtual LUN 210 may include two regions of inserted metadata: a header 215 and a trailer 225. Between the header 215 and the trailer 225, blocks 220A of the virtual LUN 210 may be mapped to source volume 205A, and blocks 220B of virtual LUN 210 may be mapped to source volume 205B. In addition the virtual LUN 210 may include one or more sets of blocks designated for communication between the off-host virtualizer 180 and the host 110, such as To-Host Message Area 230 and From-Host Message Area 240, as well as one or more unmapped areas 222A and 222B. An attempt to perform an I/O operation to an unmapped area such as 222A may result in an I/O error. As described later in conjunction with the description of FIG. 9, unmapped areas may be used to reduce the likelihood of inadvertent or malicious corruption of data in some embodiments. Further details on the kinds of information that may be communicated using To-Host Message Area 230 and From-Host Message Area 240 are also provided below. Operating-system specific metadata included in header 215 and/or trailer 225 may be used by disk driver layer 114 to recognize the virtual LUN 210 as an addressable storage device. The lengths of header 215 and trailer 225, as well as the format and content of the metadata, may vary with the operating system in use at host 110. It is noted that in some embodiments, the metadata may require only a header 215, or only a trailer 225, rather than both a header and a trailer, or the metadata may be stored at any arbitrary offset within the LUN.

The metadata inserted within virtual LUN 210 may be stored in persistent storage, e.g., within some blocks of physical block device 120 or at off-host virtualizer 180, in some embodiments, and logically concatenated with the mapped blocks 220. In other embodiments, the metadata may be generated on the fly, whenever a host 110 accesses the virtual LUN 210. In some embodiments, the metadata may be generated by an external agent other than off-host virtualizer 180. The external agent may be capable of emulating metadata in a variety of formats for different operating systems, including operating systems that may not have been known when the off-host virtualizer 180 was deployed. In one embodiment, off-host virtualizer 180 may be configured to support more than one operating system; i.e., off-host virtualizer may logically insert metadata blocks corresponding to any one of a number of different operating systems when presenting virtual LUN 210 to a host 110, thereby allowing hosts with different operating systems to share virtual LUN 210.

Figure 3:
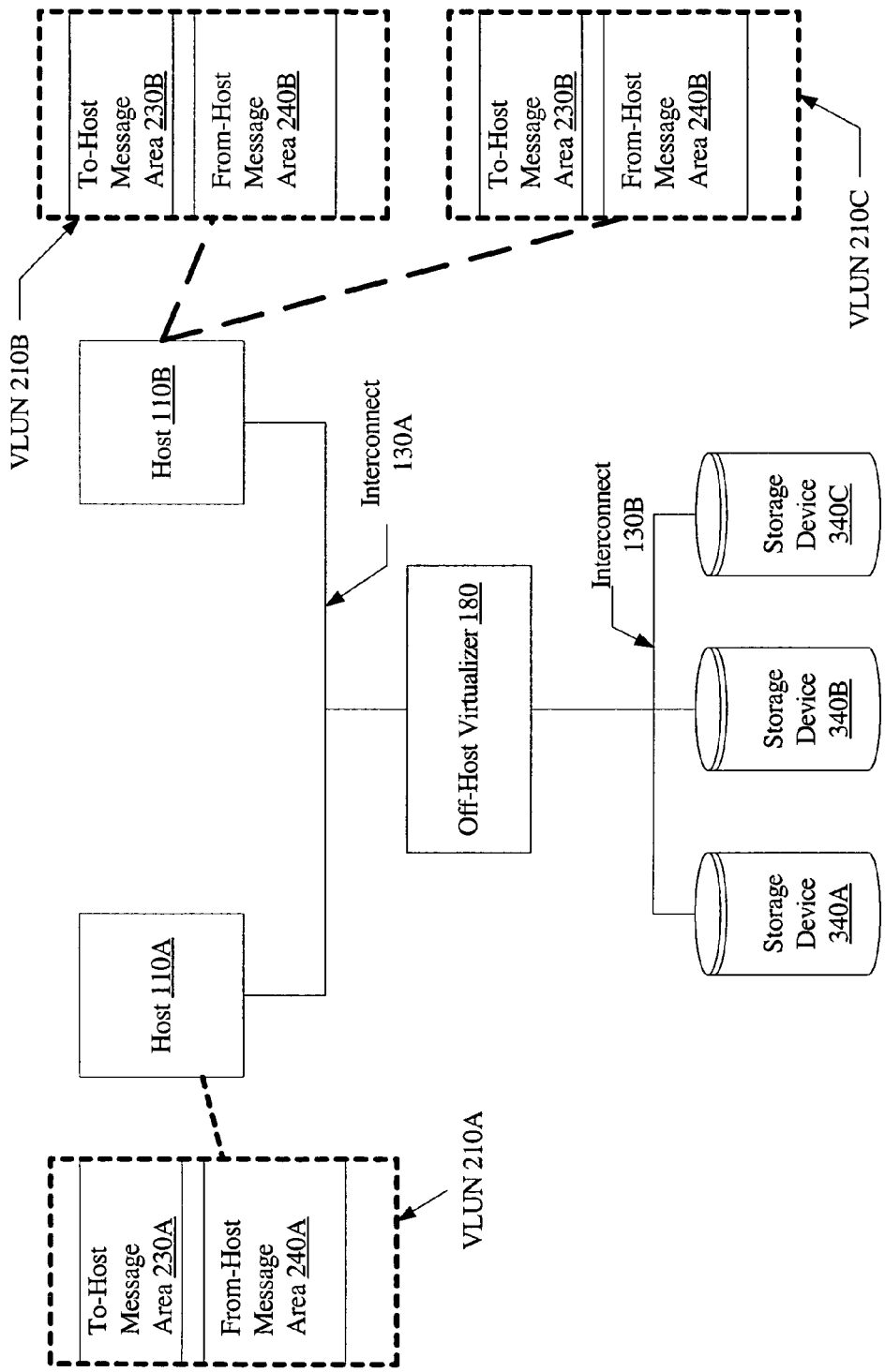
FIG. 3 is a block diagram illustrating an embodiment including an off-host virtualizer configured to create a plurality of virtual LUNs.

FIG. 3 is a block diagram illustrating an embodiment including an off-host virtualizer 180 configured to create a plurality of virtual LUNs (VLUNs) 210. As shown, more than one VLUN may be associated with a single host 110. For example, off-host virtualizer 180 may assign VLUNs 210A to host 110A, and VLUNs 210B and 210C to host 110B. In some embodiments, multiple VLUNs may be associated with a given host to allow for isolation of storage used for different applications, or to allow access to storage beyond the maximum allowable LUN size supported in the system. In the illustrated embodiment, hosts 110A and 110B may be coupled to off-host virtualizer 180 via interconnect 130A, and off-host virtualizer 180 may be coupled to storage devices 340A, 340B and 340C (collectively, storage devices 340) via interconnect 130B. Storage devices 340 may include physical block devices 120 as well as virtual block devices (e.g., in embodiments employing multiple layers of virtualization). In one embodiment, off-host virtualizer 180 may be configured to dynamically map physical and/or virtual storage from storage devices 340 to the virtual LUNs 210. Hosts 110A and 110B may be configured to use different operating systems in some embodiments, and may utilize the same operating system in other embodiments.

As described earlier, operating system-specific metadata (e.g., in header 215 and/or trailer 225 of FIG. 2) generated by off-host virtualizer 180 may allow disk driver layer 114 at a host 110 to detect the existence of a virtual LUN 210 as an addressable storage device, i.e., a device whose blocks may be accessed by providing a device identifier and a block offset within the device. After VLUN 210 has been recognized by disk driver layer 114, a block at any offset within the VLUN address space may be accessed by the disk driver layer 114, and thus by any other layer above the disk driver layer. For example, in one embodiment, intermediate driver layer 113 at host 110A may be configured to communicate with off-host virtualizer 180 by reading configuration information from To-Host Message Area 230A that has been written by off-host virtualizer 180. In addition, in one embodiment, intermediate driver layer 113 at host 110A may also be configured to write host-generated configuration information to From-Host Message Area 230B, which may be read by off-host virtualizer 180. Intermediate driver layers 113 at other hosts 110 in the system may be similarly configured to utilize To-Host Message Areas and From-Host Message Areas in their respective VLUNs to communicate with off-host virtualizer 180. In this way, two-way communication between hosts 110 and off-host virtualizer 130 may be implemented using designated blocks of emulated VLUNs 210. In some embodiments, the locations or offsets at which the designated blocks (e.g., the offset of To-Host Message Area 230 and From-Host Message Area 240) may be found within a VLUN 210 may be made known to intermediate driver 113 in an initialization step (e.g., via a parameter file read at startup), or the locations may be fixed or "hard-wired", e.g., based on constants defined in code corresponding to intermediate driver 113 and off-host virtualizer 180. In other embodiments, off-host virtualizer 180 (or another external entity) may send an explicit out-of-band message (e.g., over an IP network) to host 110 indicating the locations or offsets.

Figure 4:
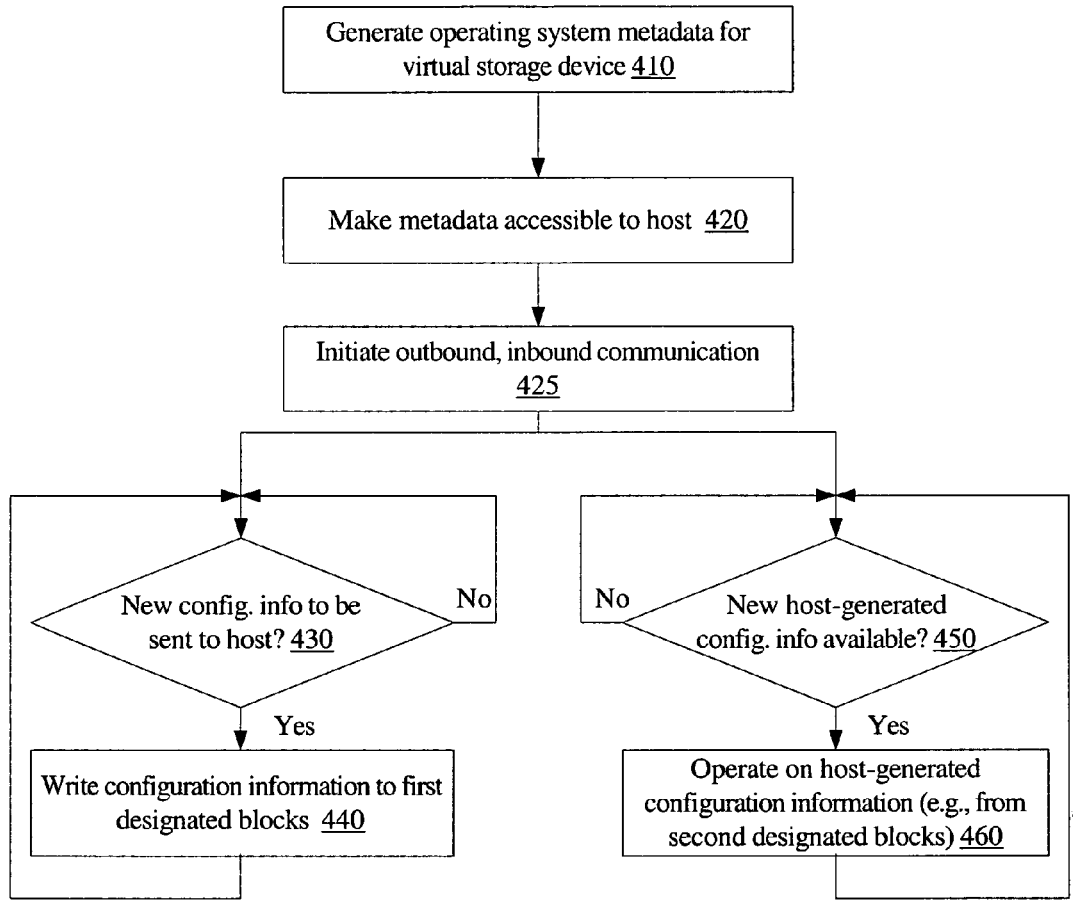
FIG. 4 is a flow diagram illustrating aspects of the operation of an off-host virtualizer configured to perform VLUN emulation and communication with a host, according to one embodiment.

FIG. 4 is a flow diagram illustrating aspects of the operation of an off-host virtualizer 180 configured to perform VLUN emulation and communication with host 110 as described above, according to one embodiment. The off-host virtualizer 180 may be configured to generate operating system metadata for virtual storage device (e.g., VLUN) emulation (block 410), and to make the metadata accessible to the host 110 (block 420). After the host 110 has recognized the virtual storage device as an addressable device, the off-host virtualizer 180 may be configured to commence communicating with the intermediate driver layer 113 (block 425). In the embodiment illustrated in FIG. 4, off-host virtualizer 180 may be configured to perform outbound communication (i.e., communication to intermediate driver layer 113 at host 110) in parallel with inbound communication (communication from host 110), e.g. by using independent threads or processes. When new configuration information targeted for the host becomes available (decision block 430), off-host virtualizer 180 may write the configuration information to a first set of designated blocks within the emulated virtual storage device (e.g., to the To-Host Message Area 230) (block 440). In some embodiments, off-host virtualizer 180 may also be configured to send a signal to the intermediate driver 113 indicating that new configuration information has been written to the designated emulated blocks. A number of different techniques may be used to send such a signal in different embodiments, such as a special error message, a simulated device reset, a SCSI reservation conflict or other mechanisms. After outbound configuration information has been written to the first set of designated blocks, off-host virtualizer 180 may be configured to repeat the outbound communication process (blocks 430, 440) whenever new configuration information to be sent to the host 110 becomes available.

When new host-generated configuration information becomes available (as detected in decision block 450), off-host virtualizer 180 may be configured to perform one or more operations in response to the configuration information provided by the host (block 460). In one embodiment, the off-host virtualizer may read the host-generated configuration information from a second set of designated blocks (e.g., From-Host Message Area 240). In some implementations, off-host virtualizer 180 may be configured to interpret the configuration information immediately upon receiving a write from the host. In other implementations, off-host virtualizer 180 may be configured to additionally or instead check for indications of changed blocks. For example, in one embodiment, a particular block within From-Host Message Area 240 may be used as a change flag or timestamp indicating that new host-generated configuration information is available, and off-host virtualizer 180 may be configured to periodically check whether the block has been modified relative to the last time host-generated configuration information was read. If the block has been modified, off-host virtualizer 180 may be configured to read the remaining blocks of From-Host Message Area 240, and in some implementations to reset the flag. In some embodiments, the flag or timestamp may encode an indication (e.g., a bitmap) of the specific blocks of From-Host Message Area that have been modified, and off-host virtualizer 180 may be configured to read only the modified blocks. After new host-generated configuration information is operated upon, off-host virtualizer 180 may be configured to repeat the process of receiving and responding to host-generated configuration information (i.e., blocks 450 and 460) as needed. In general, the sending of outbound configuration information to the host, and the receiving of inbound configuration information from the host, may be performed in any order, rather than in parallel as illustrated in FIG. 4. In some embodiments, only one-way communication may be implemented, rather than the two-way communication illustrated in FIG. 4: that is, either communication from off-host virtualizer 180 to host 110 may be implemented, or communication to off-host virtualizer 180 from 110 may be implemented.

Figure 5:
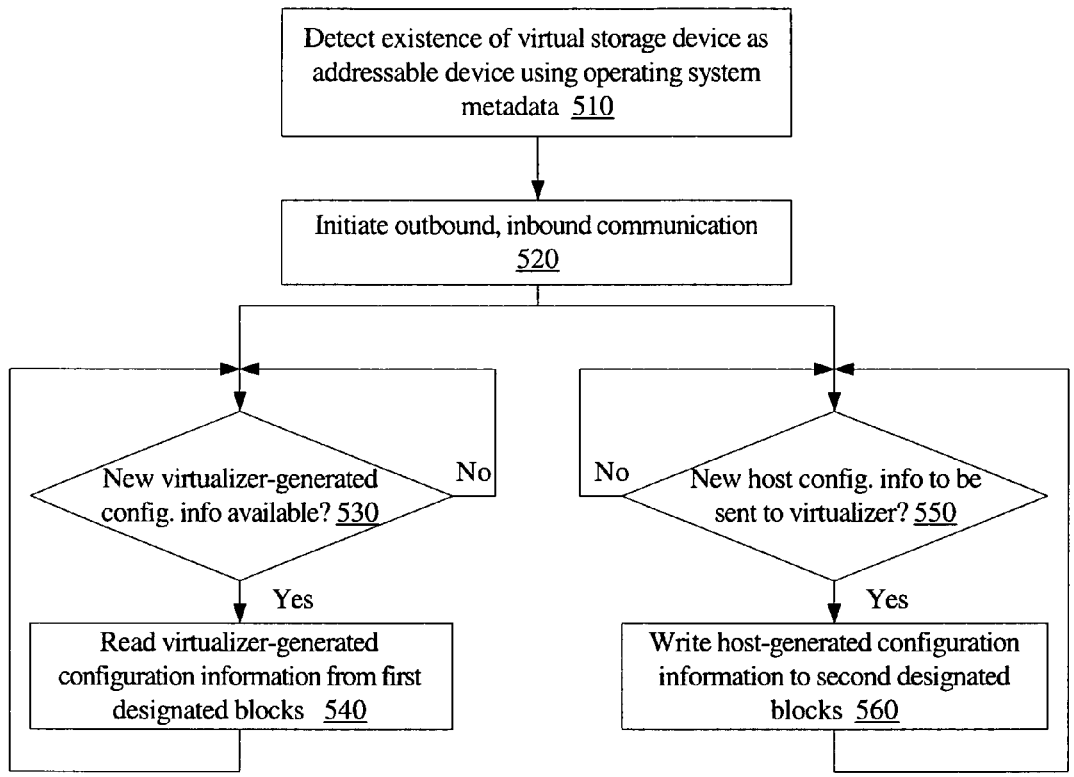
FIG. 5 is a flow diagram illustrating aspects of the operation of a host configured to communicate with an off-host virtualizer, according to one embodiment.

FIG. 5 is a flow diagram illustrating aspects of the operation of a host 110 configured to communicate with off-host virtualizer 180 as described above, according to one embodiment. A first layer of a storage software stack at the host (e.g., a disk driver layer) may be configured to recognize or detect the existence of a virtual storage device as an addressable device using operating system metadata provided by off-host virtualizer 180 (block 510). Once the virtual storage device has been recognized, the host 110 may commence outbound communication (i.e., communication to the off-host virtualizer 180) and inbound communication (i.e., communication from off-host virtualizer 180) in parallel (block 520), e.g., using one thread or process to manage inbound communication and another thread or process to manage outbound communication. When new virtualizer-generated configuration information becomes available (as detected in decision block 530), a second layer of the storage software stack (e.g., intermediate driver 113) may be configured to read the new configuration information from the first set of designated blocks (block 540). As described earlier, in some embodiments, off-host virtualizer 180 may be configured to send a signal (such as a special error message) to host 110 indicating that new virtualizer-generated configuration information is available.

When new host-related configuration information is available to be sent to off-host virtualizer 180 (as detected in block 550), the second layer of the storage software stack may be configured to write the new configuration information to the second set of designated blocks (block 560). In general, the sending of outbound configuration information to the off-host virtualizer 180, and the receiving of inbound configuration information from the off-host virtualizer 180, may be performed in any order at the host 110, rather than in parallel as illustrated in FIG. 5. As noted earlier, in some embodiments, only one-way communication may be implemented, rather than the two-way communication illustrated in FIG. 5.

Figure 6A:
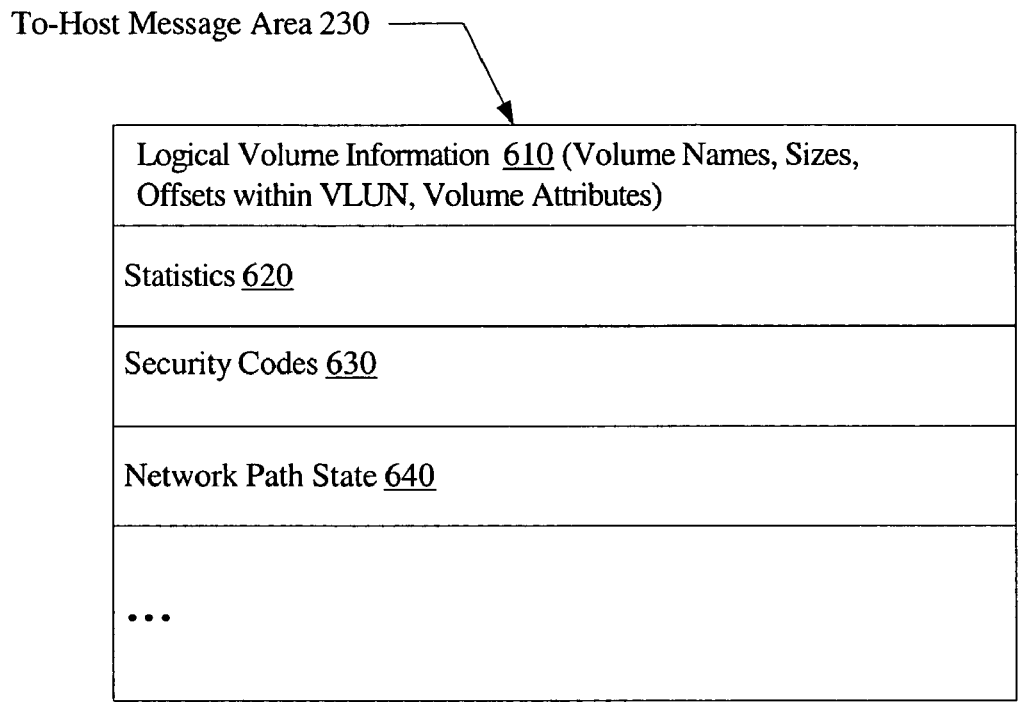
FIG. 6a is a block diagram illustrating exemplary types of configuration information that may be communicated by an off-host virtualizer to a host, according to one embodiment.

FIG. 6a is a block diagram illustrating exemplary types of configuration information that may be communicated by off-host virtualizer 180 to host 110 using a designated set of blocks such as To-Host Message Area 230, according to one embodiment. As shown, the configuration information may include volume information 610, statistics 620, security codes 630, and network path state 640. As described earlier, in some embodiments, off-host virtualizer 180 may be configured to aggregate storage within storage devices 340 into one or more logical volumes 205, and to make the logical volumes accessible for I/O operations from host 110 as part of a virtual LUN 210. In such embodiments, information on the logical volume names, sizes, locations or offsets within the VLUN, as well as other volume attributes may be provided to intermediate driver layer 113 as part of logical volume information 610. In one embodiment, statistics 620 such as I/O rates to a particular volume or set of volumes, the number of connected clients accessing a particular volume, the average size of completed I/Os, utilization levels of various backing storage devices 340, network links within interconnects 130, as well as processors at various devices including the off-host virtualizer 180, may be included in the configuration information sent to the host 110. Such statistics may be used, for example, to make load-balancing decisions at the host, to generate requests for provisioning of additional resources.

In some embodiments, off-host virtualizer 180 may participate in the implementation of a security policy designed to ensure that only authorized entities get access to various storage devices, such as logical volumes 205 and/or storage devices 340. In one such embodiment, off-host virtualizer 180 may be configured to provide one or more security codes 630 to hosts 110 using To-Host Message Area 230. The security codes may, for example, be included in I/O requests generated from host 110, and may be verified at off-host virtualizer 180 or at storage devices 340: that is, if an I/O request from a host does not include a valid security code 630, the I/O request may be rejected. In some embodiments, off-host virtualizer 180 may also be configured to utilize To-Host Message Area 230 to inform host 110 that access from the host to one or more storage devices has been revoked, e.g., by providing an invalid security code 630.

In some storage environments, multiple physical paths may be available between a given host 110 and a physical storage device 340. For example, in one embodiment, interconnects 130A and/or 130B may include multiple fibre channel switches forming one or more fibre channel fabrics, where more than one set of physical fibre channel links may connect a host 110 to a back-end physical storage device. In such embodiments, off-host virtualizer 180 may be configured to maintain network path information, such as a map of the physical links connecting hosts 110 to physical storage devices 340, and to provide a given host 110 with state information on the network paths available from that host using network path state entries 640 within To-Host Message Area 230. For example, if a particular link or switch on a path between a host 110 and a back-end physical storage device 340 become unavailable due to a failure detected by off-host virtualizer 180, an indication of the failure may be provided to the host, allowing the host to use an alternate path for future I/O operations targeted at the back-end physical storage device. Various other types of virtualizer-generated configuration information may also be provided to host 110 in different embodiments.

Figure 6B:
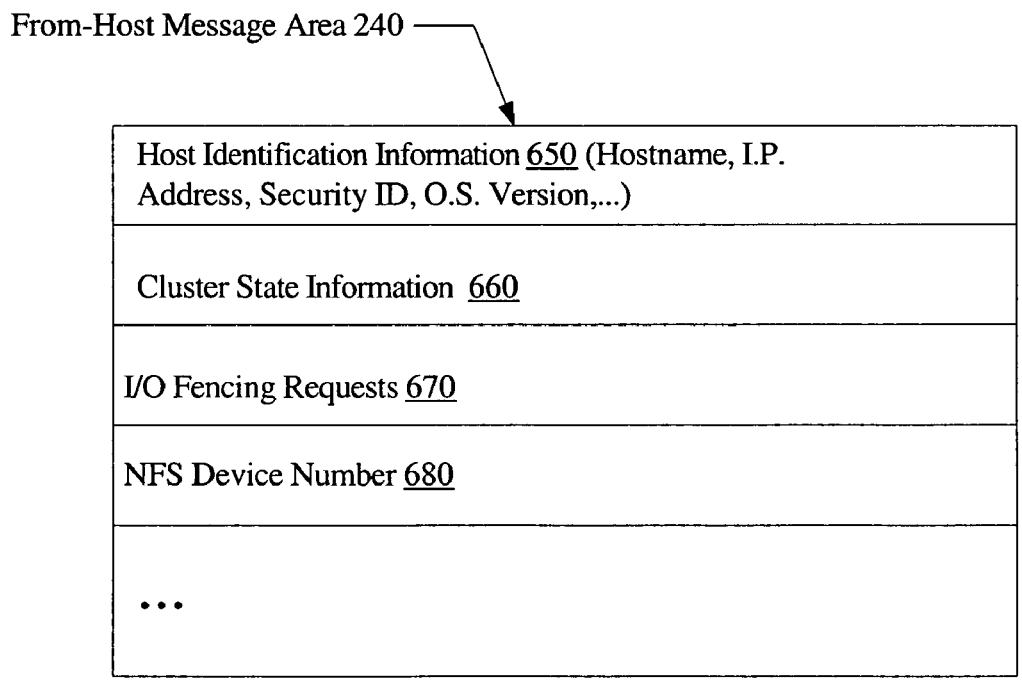
FIG. 6b is a block diagram illustrating exemplary types of configuration information that may be communicated by a host to an off-host virtualizer, according to one embodiment.

FIG. 6b is a block diagram illustrating exemplary types of configuration information that may be communicated by host 110 to off-host virtualizer 180 using a second designated set of blocks, such as From-Host Message Area 240, according to one embodiment. Such configuration information may include host identification information 650, cluster state information 660, I/O fencing requests 670, and NFS device numbers 680. For example, a host 110 may be configured to provide off-host virtualizer 180 with certain types of host identification information 650, such as a host name, an IP address that may be used by off-host virtualizer to communicate with the host, a security identifier associated with the host, and details about the operating system version in use at the host. In some embodiments, the operating system metadata (e.g., header 215 and/or trailer 225) generated by off-host virtualizer 180 may be common to more than one operating system; i.e., two or more hosts 110 with different operating systems may each be able to detect the existence of the virtual LUN 210 as an addressable device using the common metadata. In such embodiments, a given host 110 may be configured to identify the specific operating system in use at the host to off-host virtualizer 180 using From-Host Message Area 240. An identification of the specific operating system (or operating system version) in use at the host may allow off-host virtualizer 180 to customize the virtualization features it provides to the host. For example, certain operating systems or operating system versions may place restrictions on the virtualization features that can be supported by the host, such as by imposing a hard limit on the total number of devices or LUNs that may be accessed from the host. By providing off-host virtualizer 180 with specific details on the operating system in use, host 110 may allow off-host virtualizer 180 to provide more enhanced virtualization features.

Figure 7:
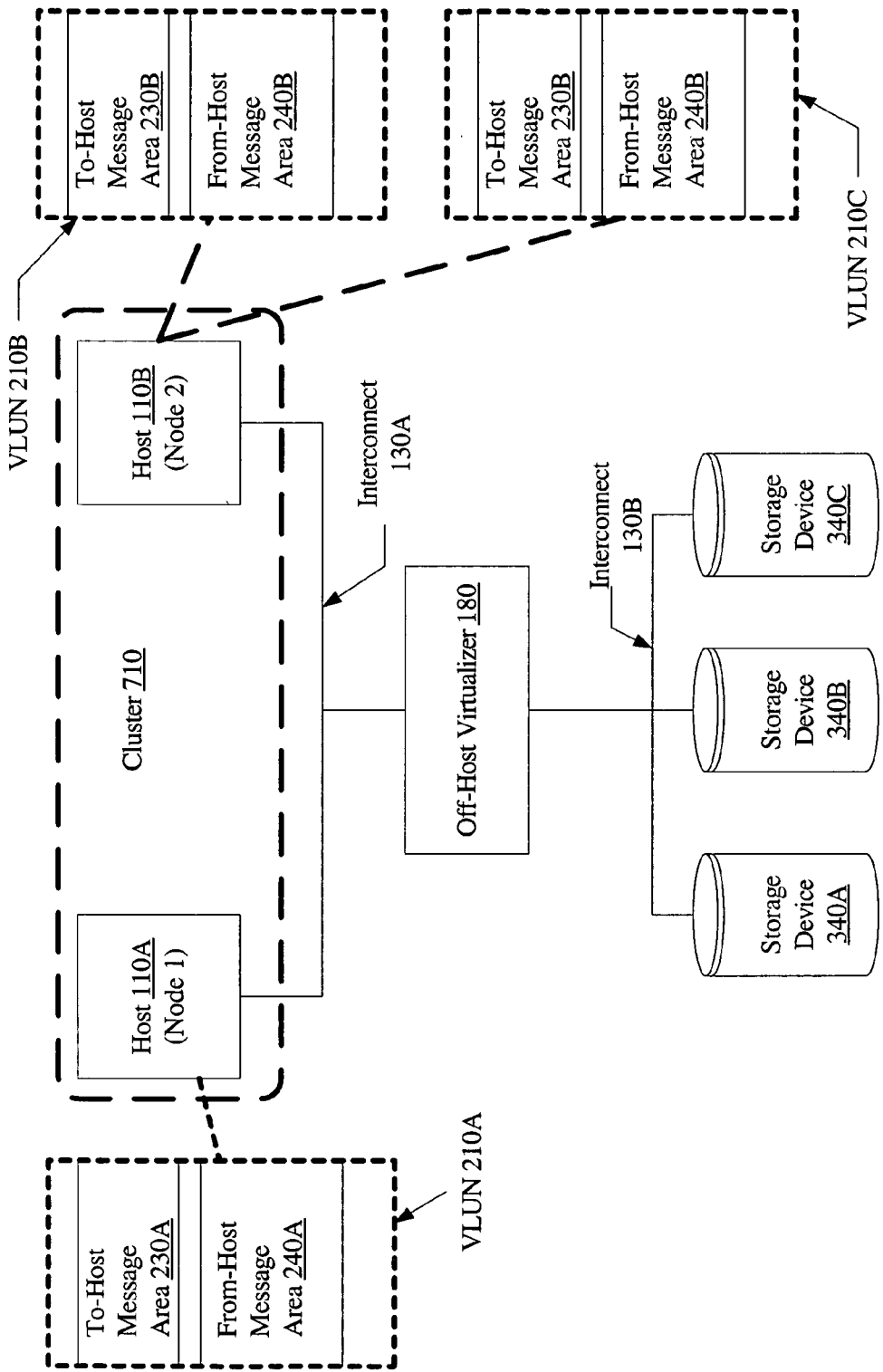
FIG. 7 is a block diagram illustrating an embodiment in which two hosts form the nodes of a cluster.

FIG. 7 is a block diagram illustrating an embodiment in which hosts 110A and 110B form nodes of a cluster 710. In such clustered environments, a host 110 may also be configured to provide an off-host virtualizer 180 with cluster state information 660 using From-Host Message Area 240. Cluster state information 660 may include, for example, a given node's current connectivity to remaining nodes (i.e., an identification of the other cluster nodes that are currently "up" and connected to the given node, as seen from the given node), resource maps specifying the ownership and/or accessibility of cluster-wide resources, node voting information during cluster reconfigurations, and the like. In some embodiments, off-host virtualizer 180 may be configured to participate in cluster management using the node-specific cluster state information 660 received from various nodes. For example, off-host virtualizer 180 may be configured to share cluster state information with a cluster manager, or to share cluster state information received from a first node with one or more remaining nodes (e.g., by copying cluster state information from a From-Host Message Area 240 in one VLUN assigned to the first node to a To-Host Message Area 230 in another VLUN assigned to a different node). It is noted that while the embodiment illustrated in FIG. 7 depicts two nodes 110A and 110B, in general a cluster 710 may include any desired number of nodes.

During certain types of reconfigurations of a storage system, access previously granted to a particular set of logical or physical storage devices may need to be temporarily or permanently revoked. For example, in some storage environments where hosts 110 and off-host virtualizers 180 may be configured to cooperate to provide distributed block virtualization, a first host 10A may be designated as a virtualization controller for a given logical volume 205A. In order to support continued virtualization functionality in the event of a failure at host 110A, a second host 110B may be designated as a secondary virtualization controller for the logical volume 205A. That is, if host 110A can no longer provide virtualization coordination for volume 205A (e.g., due to a system crash, a hardware failure, or a software malfunction), host 110B may be configured to take over the virtualization coordination. Access to volume 205A from host 110A may therefore need to be revoked. A technique termed "I/O fencing" may be employed to revoke the access. In general, I/O fencing is an operation performed on a block device to prevent I/Os by other hosts or initiators to the block device. If volume 205A is being tunneled to host 110A through a VLUN 210A by an off-host virtualizer 180, I/O fencing may be accomplished by requesting the off-host virtualizer 180 to disable further access to the VLUN 210A. For example, secondary virtualization controller 110B may be configured to send an I/O fencing request 670 to off-host virtualizer 180 using From-Host Message Area 240 in a VLUN 210B. On receiving the I/O fencing request, off-host virtualizer 180 may prevent further access to VLUN 210A (e.g., by modifying or removing the operating system metadata that allows host 110A to access VLUN 210A).

Figure 8:
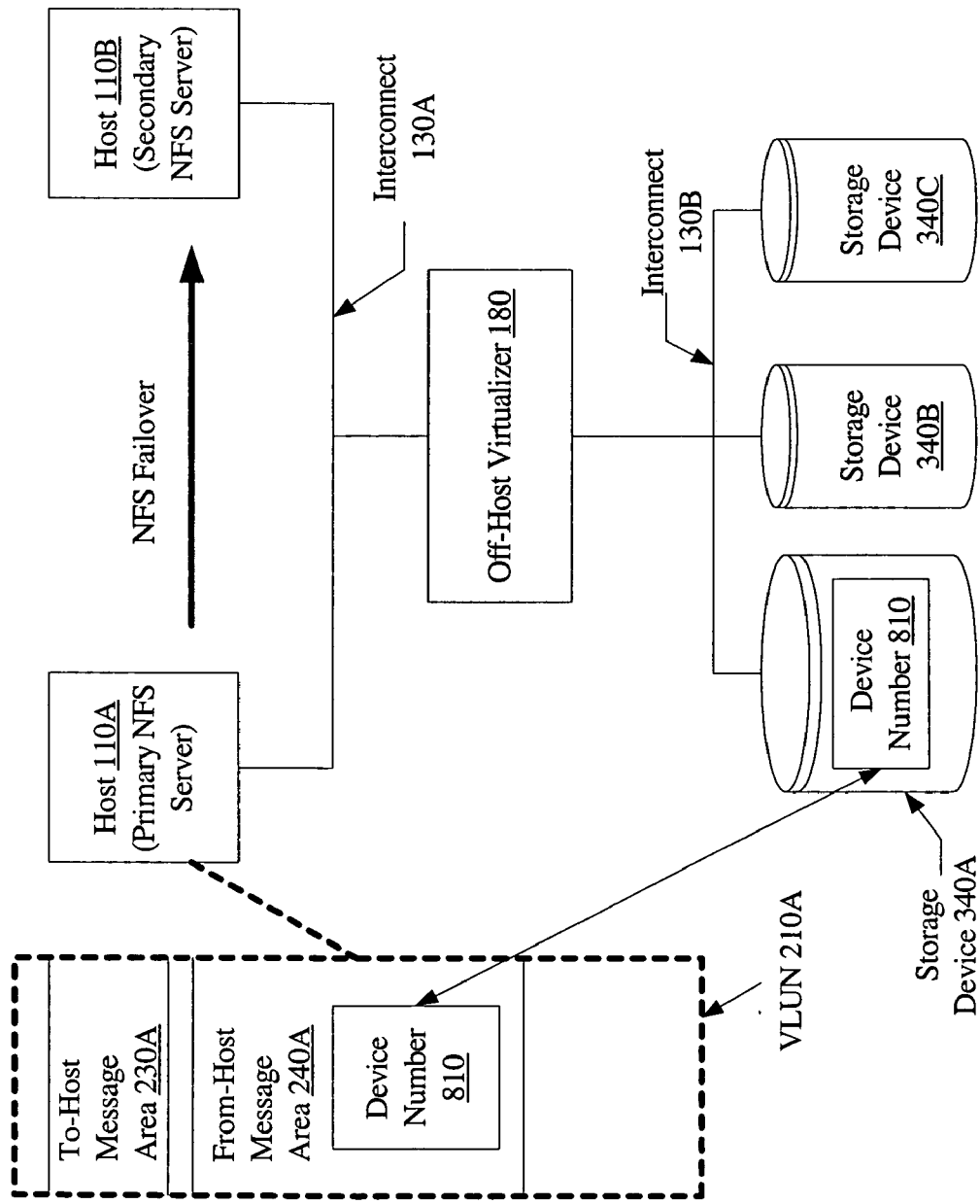
FIG. 8 is a block diagram illustrating one embodiment where a first host is configured as a primary NFS server providing access to a file system backed by a storage device, and a second host is configured as a backup or secondary NFS server for the file system.

Another type of communication from host 110 to off-host virtualizer 180 may be useful in storage environments employing the Network File System (NFS). FIG. 8 is a block diagram illustrating one embodiment where host 110A is configured as a primary NFS server providing access to a file system backed by storage device 340A, and host 110B is configured as a backup or secondary NFS server for the file system. Backup NFS server 110B may be configured to take over NFS server functions in the event of a failure at host 110A. An NFS client typically maintains a pointer called a "file handle" for each open NFS file accessed by the client. A file handle may be formed from a "device handle" and a file identifier. The device handle is traditionally built using a kernel device number, i.e., an identifier maintained by an operating system kernel for each storage device visible to the kernel. The file identifier is traditionally an inode identifier and/or an inode generation number (an inode is a data structure holding information about a file or a directory in a Unix file system). When NFS service for a particular file system is moved from one host to another, e.g., when NFS service for the file system backed on storage device 340A is failed over to host 110B, it is important that file handles seen by NFS clients remain the same.

While the file identifier, which is based on persistently maintained inode data, may remain consistent after the failover with no extra work required, keeping device handles consistent between host 10A and host 10B may be more complicated. Since kernel device numbers are generally implemented as small integers (e.g., 32-bit integers), globally unique device numbers may be hard to implement. In addition, the specific kernel device number selected by the kernel for a particular device may vary with the hardware configuration at the corresponding host—e.g., if host 110A has more or fewer devices (such as buses, slots, disks, etc.) configured than host 110B, it may be unlikely that the NFS device number selected at host 110B would be the same device number that was used at host 110A prior to failover. In such situations, host 110A may be configured to store the device number 810 (corresponding to NFS device number 680 shown in FIG. 6b) within VLUN 210A, e.g., within From-Host Message Area 240A. That is, the device number 810 used by primary NFS server 110A to create file handles for NFS clients may be persisted within the same backing storage device 340A that is used to back the NFS file system. When NFS server responsibilities for the file system are failed over to host 110B, host 110B may be configured to access the device 340A via a second VLUN 210B in one embodiment, allowing the stored device number 810 to be read by host 110B. In another embodiment, off-host virtualizer 180 may be configured to provide the last-used device number 810 for a particular NFS file system to backup NFS server 1110B using some other mechanism, e.g., in response to a query from backup NFS server 110B. The backup NFS server 1110B may be configured to associate the same device number 810 with the backing storage device 340A as was used by primary NFS server 110A, thereby maintaining NFS file handle consistency. It is noted that despite the communication of the device number 810 to the backup NFS server, in some rare cases (e.g., if the device number is already in use by the kernel at the backup NFS server) it may not be possible to reuse the device number. In some embodiments, an external entity may be configured to provide unique identifiers for use by intermediate driver 113 in generating device IDs, and such unique identifiers may be stored in the VLUNs.

Figure 9:
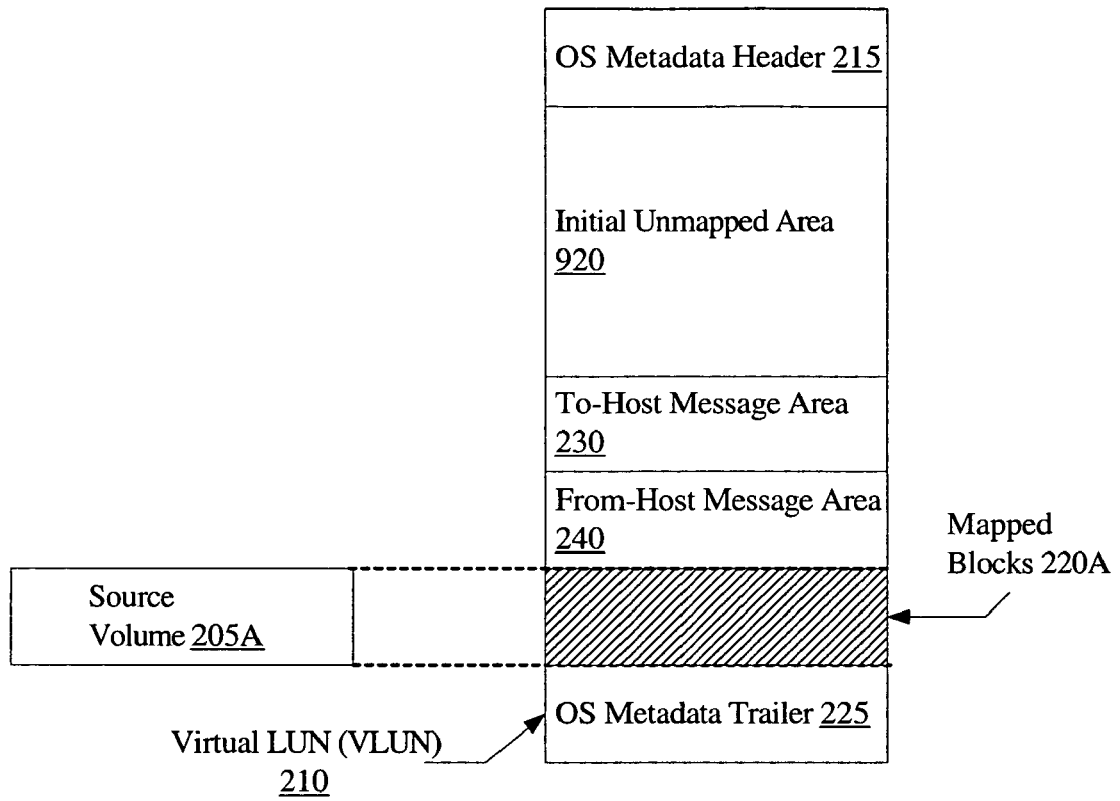
FIG. 9 is a block diagram illustrating an embodiment where an off-host virtualizer may be configured to leave an initial range of blocks within a virtual LUN unmapped for enhanced security.

In some embodiments, off-host virtualizer 180 may also be configured to leave an initial range of blocks within a VLUN 210 unmapped for enhanced security. FIG. 9 is a block diagram illustrating such an embodiment, where VLUN 210 includes an initial unmapped area 920. An I/O operation targeted at the unmapped area 920 may result in an I/O error being sent to the requester of the I/O operation. By leaving a relatively large set of initial blocks unmapped, such as one or more gigabytes (GB) of unmapped blocks, off-load virtualizer 180 may ensure that an inadvertent or malicious attempt to write to VLUN 210 is more likely to result in an I/O error rather than a corruption of the meaningful data that may be located (at larger offsets than the unmapped area) within VLUN 210. For example, if unmapped area 920 is 2 GB in size, any attempts to write to the first 2 GB of the address space of VLUN 210 will result in I/O errors. An inadvertent or malicious writer, which may begin by attempting to write to the first few blocks of the VLUN 210 directly (e.g., bypassing any logical devices that may have been created by intermediate driver layer 113), may be less likely to continue attempting writes after receiving a series of I/O errors. Mapped blocks 220A corresponding to source volume 205A, as well as From-Host Message Area 240 and To-Host Message Area 230, may remain unaffected by the inadvertent or malicious write attempts.

In various embodiments, off-host virtualizer 180 may implement numerous different types of storage functions using block virtualization. For example, in one embodiment a virtual block device such as a logical volume may implement device striping, where data blocks may be distributed among multiple physical or logical block devices, and/or device spanning, in which multiple physical or logical block devices may be joined to appear as a single large logical block device. In some embodiments, virtualized block devices may provide mirroring and other forms of redundant data storage, the ability to create a snapshot or static image of a particular block device at a point in time, and/or the ability to replicate data blocks among storage systems connected through a network such as a local area network (LAN) or a wide area network (WAN), for example. Additionally, in some embodiments virtualized block devices may implement certain performance optimizations, such as load distribution, and/or various capabilities for online reorganization of virtual device structure, such as online data migration between devices. In other embodiments, one or more block devices may be mapped into a particular virtualized block device, which may be in turn mapped into still another virtualized block device, allowing complex storage functions to be implemented with simple block devices. More than one virtualization feature, such as striping and mirroring, may thus be combined within a single virtual block device in some embodiments, creating a logically hierarchical virtual storage device.

The off-host virtualizer 180, either alone or in cooperation with one or more other virtualizers such as a volume manager at host 110 or other off-host virtualizers, may provide functions such as configuration management of virtualized block devices and distributed coordination of block device virtualization. For example, after a reconfiguration of a logical volume shared by two hosts 110 (e.g., when the logical volume is expanded, or when a new mirror is added to the logical volume), the off-host virtualizer 180 may be configured to distribute metadata or a volume description indicating the reconfiguration to the two hosts 110. In one embodiment, once the volume description has been provided to the hosts, the storage stacks at the hosts may be configured to interact directly with various storage devices 340 according to the volume description (i.e., to transform logical I/O requests into physical I/O requests using the volume description). Distribution of a virtualized block device as a volume to one or more virtual device clients, such as hosts 110, may be referred to as distributed block virtualization.

As noted previously, in some embodiments, multiple layers of virtualization may be employed, for example at the host level as well as at an off-host level, such as at a virtualizing switch or at a virtualization appliance. In such embodiments, some aspects of virtualization may be visible to a virtual device consumer such as file system layer 112, while other aspects may be implemented transparently by the off-host level. Further, in some multilayer embodiments, the virtualization details of one block device (e.g., one volume) may be fully defined to a virtual device consumer (i.e., without further virtualization at an off-host level), while the virtualization details of another block device (e.g., another volume) may be partially or entirely transparent to the virtual device consumer.

In some embodiments, a virtualizer, such as off-host virtualizer 180, may be configured to distribute all defined logical volumes to each virtual device client, such as host 110, present within a system. Such embodiments may be referred to as symmetric distributed block virtualization systems. In other embodiments, specific volumes may be distributed only to respective virtual device consumers or hosts, such that at least one volume is not common to two virtual device consumers. Such embodiments may be referred to as asymmetric distributed block virtualization systems.

It is noted that off-host virtualizer 180 may be any type of device, external to host 110, that is capable of providing the virtualization functionality, including PLUN and volume tunneling, described above. For example, off-host virtualizer 180 may include a virtualizing switch, a virtualization appliance, a special additional host dedicated to providing block virtualization, or an embedded system configured to use application specific integrated circuit (ASIC) or field-programmable gate array (FPGA) technology to execute provide block virtualization functionality. A virtualizing switch may be an intelligent fibre channel switch, configured with sufficient processing capacity to perform virtualization functions in addition to providing fibre channel connectivity. A virtualization appliance may be an intelligent device programmed to provide virtualization functions, such as mirroring, striping, snapshots, and the like. An appliance may differ from a general-purpose computer in that the appliance software is normally customized for the function (such as virtualization) to which the appliance is dedicated, pre-installed by the vendor, and not easily modifiable by a user. In some embodiments, off-host block virtualization may be provided by a collection of cooperating devices, such as two or more virtualizing switches, instead of a single device. Such a collection of cooperating devices may be configured for failover, i.e., a standby cooperating device may be configured to take over the virtualization functions supported by a failed cooperating device. An off-host virtualizer 180 may incorporate one or more processors, as well as volatile and/or non-volatile memory. In some embodiments, configuration information associated with virtualization may be maintained at a database separate from the off-host virtualizer 180, and may be accessed by off-host virtualizer over a network. In one embodiment, an off-host virtualizer may be programmable and/or configurable. Numerous other configurations of off-host virtualizer 180 are possible and contemplated. A host 110 may be any computer system, such as a server comprising one or more processors and one or more memories, capable of supporting the storage software stack described above. Any desired operating system may be used at a host 110, including various versions of Microsoft Windows™, Solaris™ from Sun Microsystems, various versions of Linux, other operating systems based on UNIX, and the like. The intermediate driver layer 113 may be included within a volume manager in some embodiments.

Figure 10:
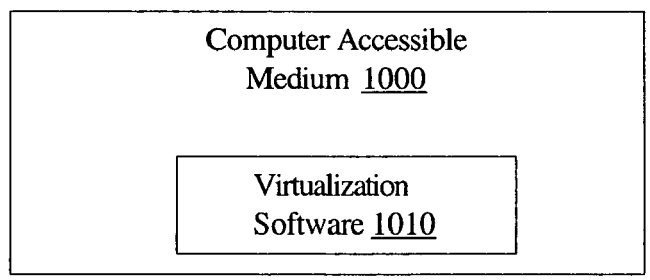
FIG. 10 is a block diagram illustrating an embodiment of a computer accessible medium.

FIG. 10 is a block diagram illustrating a computer-accessible medium 1000 comprising virtualization software 1010 capable of providing the functionality of off-host virtualizer 180 and storage software stack 140B described above. Virtualization software 1010 may be provided to a computer system using a variety of computer-accessible media including electronic media (e.g., flash memory), magnetic media such as RAM (e.g., SDRAM, RDRAM, SRAM, etc.), optical storage media such as CD-ROM, etc., as well as transmission media or signals such as electrical, electromagnetic or digital signals, conveyed via a communication medium such as a network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
   a first host;
   an off-host virtualizer comprising at least one processor and a memory, wherein the memory stores program instructions, wherein the program instructions are executable by the at least one processor to:
   generate and load into the memory a plurality of sets of operating system metadata corresponding to a plurality of different operating systems for a virtual storage device;
   receive a request from the first host to access the virtual storage device, wherein the request is received after the generating and loading of the plurality of sets of operating system metadata;
   determine an identity of an operating system used by the first host;
   select a set of operating system metadata corresponding to one of the plurality of different operating systems based on the determined identity of the operating system used by the first host;
   make the selected set of operating system metadata accessible to the first host; and
   provide configuration information at a designated range of blocks within the virtual storage device, wherein the configuration information comprises at least a portion of the selected set of operating system metadata, wherein the designated range of blocks is dependent upon the determined identity of the operating system used by the first host;
   wherein the first host comprises a storage software stack including a first layer and a second layer;
   wherein the first layer is configured to use the selected set of operating system metadata to detect an existence of the virtual storage device as addressable storage; and
   wherein the second layer is configured to read the configuration information from the designated range of blocks.

2. The system as recited in claim 1, wherein the configuration information includes a volume identifier and a volume length.

3. The system as recited in claim 1, wherein the configuration information includes a security code.

4. The system as recited in claim 1, wherein the configuration information includes multi-pathing state information.

5. The system as recited in claim 1, wherein the configuration information includes statistics on I/O operations performed on the virtual storage device.

6. The system as recited in claim 1, wherein the second layer is configured to write additional configuration information to a second designated range of blocks within the virtual storage device, and wherein the program instructions are further executable by the at least one processor to operate in response to the additional configuration information.

7. The system as recited in claim 6, wherein the first host is a node of a cluster, and wherein the additional configuration information includes cluster state information.

8. The system as recited in claim 6, wherein the additional configuration information includes an I/O fencing request.

9. The system as recited in claim 6, wherein the additional configuration information includes a device number associated with a physical storage device, wherein the device number is used as part of a file handle during Network File System (NFS) operations.

10. The system as recited in claim 9, further comprising a second host, wherein the device number is used to maintain file handle consistency when NFS service for a particular file system is transferred from the first host to the second host.

11. The system as recited in claim 6, wherein the additional configuration information includes an identifier for the first host.

12. The system as recited in claim 6, wherein the additional configuration information includes an identification of an operating system in use at the first host.

13. The system as recited in claim 1, wherein the off-host virtualizer is a virtualizing switch.

14. The system as recited in claim 1, wherein the off-host virtualizer is a virtualization appliance.

15. The system as recited in claim 1, wherein the program instructions are further executable by the at least one processor to leave an initial range of blocks of the virtual storage device unmapped to physical storage, and to return an I/O error in response to an I/O operation directed at the initial range of blocks.

16. A method comprising:
generating and loading into a memory a plurality of sets of operating system metadata corresponding to a plurality of different operating systems for a virtual storage device at an off-host virtualizer comprising the memory;
receiving a request from a first host to access the virtual storage device, wherein the request is received after the generating and loading of the plurality of sets of operating system metadata;
determining an identity of an operating system used by the first host;
selecting a set of operating system metadata corresponding to one of the plurality of different operating systems based on the determined identity of the operating system used by the first host;
making the selected set of operating system metadata accessible to a first layer of a storage software stack at a first host;
the off-host virtualizer providing configuration information at a designated range of blocks within the virtual storage device, wherein the configuration information comprises at least a portion of the selected set of operating system metadata, wherein the designated range of blocks is dependent upon the determined identity of the operating system used by the first host;
the first layer using the selected set of operating system metadata to detect an existence of the virtual storage device as a logical unit (LUN); and
a second layer of the storage software stack reading the configuration information from the designated range of blocks.

17. The method as recited in claim 16, further comprising:
the second layer writing additional configuration information to a second designated range of blocks; and
the off-host virtualizer operating in response to the additional configuration information.

18. The method as recited in claim 16, wherein the off-host virtualizer is a virtualizing switch.

19. The method as recited in claim 16, wherein the off-host virtualizer is a virtualization appliance.

20. A computer accessible storage medium comprising program instructions, wherein the instructions are executable to:
generate and load into a memory a plurality of sets of operating system metadata corresponding to a plurality of different operating systems for a virtual storage device at an off-host virtualizer comprising the memory;
receive a request from a first host to access the virtual storage device, wherein the request is received after the generation of the plurality of sets of operating system metadata;
determine an identity of an operating system used by the first host;
select a set of operating system metadata corresponding to one of the plurality of different operating systems based on the determined identity of the operating system used by the first host;
make the selected set of operating system metadata accessible to a first layer of a storage software stack at the first host;
provide configuration information from the off-host virtualizer at a designated range of blocks within the virtual storage device, wherein the configuration information comprises at least a portion of the selected set of operating system metadata, wherein the designated range of blocks is dependent upon the determined identity of the operating system used by the first host;
use the selected set of operating system metadata at the first layer to detect an existence of the virtual storage device as a logical unit (LUN); and
read the configuration information from the designated range of blocks at a second layer of the storage software stack.

21. The computer accessible storage medium as recited in claim 20, wherein the instructions are further executable to:
write additional configuration information to a second designated range of blocks of the virtual storage device from the second layer; and
operate on the additional configuration information from the off-host virtualizer.

22. The computer accessible storage medium as recited in claim 20, wherein the off-host virtualizer is a virtualizing switch.

23. The computer accessible storage medium as recited in claim 20, wherein the off-host virtualizer is a virtualization appliance.

* * * * *